Jan. 1, 1935. L. P. KALB 1,985,996
INTERNAL COMBUSTION ENGINE
Original Filed Feb. 6, 1930
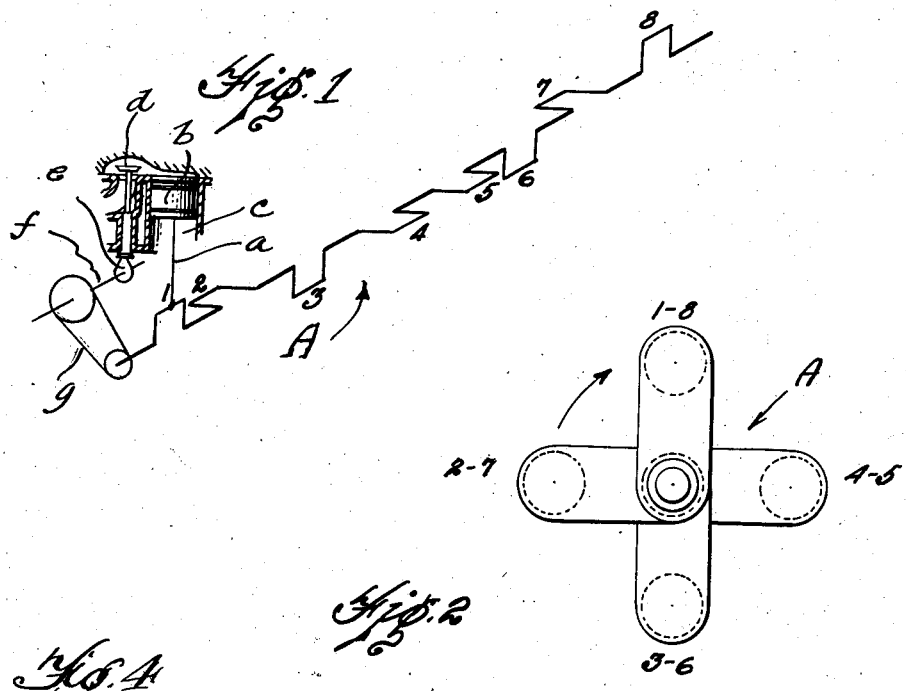
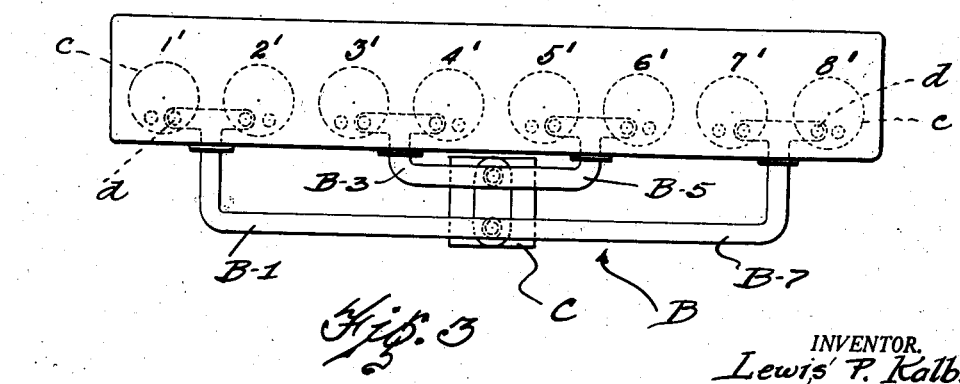
INVENTOR.
Lewis P. Kalb.
BY
ATTORNEY.

Patented Jan. 1, 1935

1,985,996

UNITED STATES PATENT OFFICE 1,985,996

INTERNAL COMBUSTION ENGINE

Lewis P. Kalb, Grosse Pointe Village, Mich., assignor to Continental Motors Corporation, Detroit, Mich., a corporation of Virginia Application February 6, 1930, Serial No. 426,227
Renewed June 30, 1934

19 Claims. (Cl. 123—52)

My invention relates to internal combustion engines and more particularly relates to an eight cylinder in line engine and the crankshaft therefor.

It is the object of my invention to increase the efficiency and power of an eight cylinder internal combustion engine by providing means for obtaining an improved distribution of the fuel and to prevent the starving of any one of said cylinders.

More particularly the object of my present invention is to improve the performance of an eight cylinder in line engine by providing a crankshaft constructed and arranged to effect an improved firing order, that results in a smoother running engine of better balance and more power.

Another object of my invention is to provide an intake manifold structure for a multi-cylinder engine providing for improved engine performance by constructing a manifold structure with branches cooperating with the various engine cylinders and so constructed and arranged in cooperation with the engine crankshaft that the intake period of the cylinders connected with the same branch do not overlap, the intake opening of the cylinders being spaced apart by 270° and 450° of the crankshaft rotation.

A further object of my invention is to construct a fuel mixture distributing structure or manifold for an engine having more than seven cylinders by providing an intake manifold including a plurality of fuel mixture conducting portions consisting of branches, each of which are connected with a pair of cylinders, and so constructed and arranged in cooperation with the engine crankshaft that an interval of substantially 270 degrees of crankshaft rotation occurs between an intake of one cylinder of each of said branches and the following intake opening of the other cylinder of the same branch.

A still further object of my invention is to provide an improved fuel mixture distributing structure cooperating with a prearranged grouping of the engine cylinders whereby to effect an improved engine performance.

For a more detailed understanding of my invention, reference may be had to the accompanying drawing, which illustrates one form which my invention may assume, and in which:

Fig. 1 is a diagrammatic view of a crankshaft,

Fig. 2 is an end elevational view of a crankshaft,

Fig. 3 is a plan view of an engine showing the manifold arrangement, and

Fig. 4 is a table of the firing order for an eight cylinder in line engine constructed in accordance with my invention.

The crankshaft as hereinafter described is solely employed with an eight cylinder in line internal combustion engine, but obviously the principle of my invention may be incorporated in other types of engines having a plurality of banks of eight cylinders. My improved crankshaft A is constructed with the usual number of bearing portions for supporting the same in the engine crankcase. The crankshaft is provided with a plurality of cranks numbered 1 to 8 inclusive and it may be seen by referring to Fig. 1 that each crank is connected with a connecting rod $a$ which connects the piston $b$ to the crankshaft, said piston being operatively supported in a cylinder $c$, the intake of fuel into each cylinder being controlled by an intake valve $d$ which is actuated by a valve cam $e$ carried by a cam shaft $f$ operatively connected with the crankshaft A by means of a chain $g$ or other suitable driving mechanism.

It will be noted that each successive crank of the crankshaft numbered from 1 to 4 inclusive is advanced 90 degrees of crankshaft rotation and that each successive crank numbered 5 to 8 inclusive is advanced 90 degrees of crankshaft rotation in an opposite direction, the cranks 1, 2, 3 and 4 being positioned in the same plane as cranks 8, 7, 6, and 5 respectively.

It will be noted that my invention is of particular significance in connection with an engine of the eight cylinder in line type, but I do not limit my invention to this particular application, since the principles of my invention may be incorporated in engines other than those of the type having aligned cylinders. Nor do I limit my invention to an engine employing a crankshaft of the particular type shown in the drawing, since the principles of my invention may be adopted with engines employing other types of crankshafts if so desired.

The engine is provided with an intake manifold B that is illustrated somewhat diagrammatically in Fig. 3, said manifold being provided with a plurality of manifold branches B—1, B—3, B—5 and B—7. The engine is preferably provided with a duplex carburetor C, the fuel being distributed to the various manifold branches in the usual manner. It will be understood that I do not limit my invention solely to a construction adapted for use with a duplex carburetor since other types of carburetors may be employed if so desired. The manifold branch B—1 is arranged to communicate with the cylinders numbered 1' and 2' that are associated with the cranks 1 and 2, each cylinder being provided with a valve d for controlling the admittance of fuel into the cylinder. Similarly branches B—3, B—5 and B—7 are connected respectively to the pair of cylinders 3' and 4', 5' and 6' and 7' and 8'.

It may be observed that the engine cylinders are arranged in two groups of four, cylinders 1, 2, 7 and 8 comprising one group and cylinders 3, 4, 5, 6 comprising the other group. Branches B—1 and B—7 together form a fuel mixture conducting portion communicating with one group of four cylinders, while branches B—3 and B—5 together form a second fuel mixture conducting portion communicating with the other group of four cylinders. It may be noted further that each group of four cylinders, arranged in two pairs of cylinders, are grouped together in separate fuel mixture distributing systems.

The construction of this crankshaft provides a firing order of 1—7—3—5—8—2—6—4. If the construction of the crankshaft were reversed, the firing order would be 1—4—6—2—8—5—3—7 which obviously would produce the same beneficial result as obtained with the first mentioned firing order. It may be here noted that the charge in cylinder 2' is fired 270 degrees of crankshaft rotation in advance of the charge in cylinder 1'. A similar time interval exists between the firing of the charge in cylinders 3' and 4', 5' and 6', and 7' and 8'. For example, assume we start with cylinder 7'. The valve associated with cylinder 7' opens at the beginning of the intake cycle, and is not entirely closed until after the intake cycle is completed, and to be more specific, the valve remains open for about 225 degrees of crankshaft rotation. Since the intake cycle of cylinder 7' is advanced 270 degrees of crankshaft rotation with respect to the intake cycle of cylinder 8', it will be noted that the valve associated with cylinder 7' is entirely closed before the valve associated with cylinder 8' is opened. Similarly the valves associated with cylinders 5', 2' and 4', are respectively closed before the valves associated with cylinders 6', 1' and 3' are opened.

In an engine of the four stroke cycle type as illustrated in the accompanying drawing and employing a manifold of the character described, the above timing of the intake may be had by arranging the structure so that the spacing between the intake openings of the cylinders connected with the same branch are at least 270 degrees. In the particular embodiment of my invention, the cylinders and associated manifold structure are so arranged in cooperation with the engine crankshaft, that successive spacings or intervals between the firing of the pair of cylinders connected with the same branch are respectively substantially 270 degrees and 450 degrees of the crankshaft rotation. For example, specifically referring to Figs. 3 and 4, in which the pairs of cylinders 1 and 2, 3 and 4, 5 and 6, and 7 and 8 are respectively connected with branches B—1, B—3, B—5 and B—7, and with particular reference to the pair of cylinders 1 and 2, taken in connection with the above firing order 1—7—3—5—8—2—6—4, it will be noted that cylinder 2 is fired after cylinder 1, the interval being substantially 450 degrees of crankshaft rotation, the cylinders numbered 7, 3, 5 and 8 being fired respectively 90 degrees apart during this interval of 450 degrees. The firing of cylinder 1 next takes place substantially 270 degrees of crankshaft rotation after the firing of cylinder 2, the cylinders numbered 6 and 4 being fired respectively 90 degrees apart during this interval of 270 degrees. Likewise, successive intervals of 270 degrees and 450 degrees occur between the opening of the intake of the pair of cylinders connected with the same manifold branch.

The old practice was to only advance the cycles 180 degrees of crankshaft rotation and consequently the secondly opened valve was opened before the valve first opened was entirely closed. As a result, the cylinder associated with the first opened valve received a greater charge of fuel than the adjoining cylinder, and the cylinder associated with the said secondly opened valve received a lesser charge of fuel and was starved. The cylinders of an engine constructed in accordance with my invention all receive a like charge, and none of the cylinders are starved.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. An eight cylinder in line internal combustion engine having intake valves, pistons operable in said cylinders, an intake manifold having a plurality of branches, each manifold branch communicating with a pair of cylinders, means for actuating the intake valves, and a crankshaft operatively connected with said pistons and with the said valve actuating means, said crankshaft constructed to effect predetermined cyclical events, the cyclical event of one of the cylinders of each pair advanced 270 degrees of crankshaft rotation with respect to the cyclical event of the other cylinder.

2. In an internal combustion engine having more than seven cylinders, each of said cylinders having intake port means, intake valves for controlling said intake port means, pistons operable in said cylinders, an intake manifold having a plurality of branches, each manifold branch communicating with a pair of cylinders, means for actuating the intake valves whereby to provide an intake period of more than 180 degrees of crankshaft rotation, and a crankshaft operatively connected with said pistons and with the said valve actuating means, said crankshaft constructed and arranged to advance the cyclical event of one of the cylinders of each pair connected with the same branch a predetermined amount to permit the intake valve of the first mentioned cylinder to close prior to the commencement of the intake period of the second mentioned cylinder.

3. An eight cylinder in line internal combustion engine having intake valves, pistons operating in said cylinders, an intake manifold having a plurality of branches each communicating with a pair of adjacent cylinders, and a crankshaft provided with cranks symmetrically constructed about the midpoint of said crankshaft, the cranks to one side of the midpoint being successively and progressively advanced 90 degrees while the cranks to the other side of the midpoint are successively and progressively advanced 90 degrees in the opposite direction.

4. An eight cylinder in line internal combustion engine having intake valves, pistons operating in said cylinders, an intake manifold having a plurality of branches each communicating with a pair of adjacent cylinders, and a crankshaft provided with cranks symmetrically constructed about the midpoint of said crankshaft, and successively numbered from one to eight, the cranks numbered 1 to 4 inclusive being progressively advanced 90 degrees while the cranks numbered 5 to 8 inclusive are progressively advanced 90° in the opposite direction, said cranks 1 and 2, 3 and 4, 5 and 6, and 7 and 8, respectively associated with said intake manifold branches.

5. An eight cylinder in line internal combustion engine having intake valves associated with said cylinders, pistons operating in said cylinders, an intake manifold having a plurality of branches each communicating with a pair of adjacent cylinders, a crankshaft provided with cranks symmetrically constructed about the midpoint of said crankshaft, the cranks to one side of the midpoint being successively and progressively advanced 90 degrees while the cranks to the other side of the midpoint are successively and progressively advanced 90 degrees in the opposite direction, and valve actuating means operatively connected with said crankshaft and constructed to open a valve associated with a cylinder of one pair of adjacent cylinders approximately 270 degrees in advance of the valve associated with said adjacent cylinder.

6. An eight cylinder in line internal combustion engine, an intake manifold having a plurality of branches each communicating with a pair of adjacent cylinders, and a crankshaft constructed for cooperative operation with said intake manifold to provide a firing order of 1—7—3—5—8—2—6—4.

7. An eight cylinder in line internal combustion engine, an intake manifold having a plurality of branches each communicating with a pair of adjacent cylinders, and a crankshaft constructed for cooperative operation with said intake manifold to effect predetermined cyclical events, the cyclical event of one of the cylinders of each pair advanced 270 degrees of crankshaft rotation with respect to the cyclical event of the other cylinder.

8. An eight cylinder in line internal combustion engine, an intake manifold having a plurality of branches each communicating with a pair of adjacent cylinders, and a crankshaft having a plurality of cranks symmetrically constructed about the midpoint of said crankshaft, the cranks to one side of the midpoint being successively and progressively advanced 90 degrees while the cranks to the other side of the midpoint are successively and progressively advanced 90 degrees in the opposite direction, said crankshaft and intake manifold cooperatively operated to effect predetermined cyclical events, the cyclical event of one of the cylinders of each pair advanced 270 degrees of crankshaft rotation with respect to the cyclical event of the other cylinder.

9. In an internal combustion engine of the eight cylinder type, a crankshaft, an intake manifold structure including a plurality of fuel mixture conducting branches, each branch communicating with a pair of engine cylinders, said manifold structure being constructed and arranged in cooperation with the crankshaft so that an interval of 270 degrees of crankshaft rotation occurs between an intake opening of one cylinder of each of said branches and the following intake opening of the other cylinder of the same branch.

10. In a multi-cylinder engine having more than seven cylinders, a crankshaft, an intake manifold structure, said manifold structure including a plurality of fuel mixture conducting substantially parallel branches extending longitudinally of the engine, said branches each connected with a pair of engine cylinders, said manifold structure being constructed and arranged in cooperation with the crankshaft so that the intake openings of the cylinders connected to the same branch are spaced apart by 270 degrees of the crankshaft rotation.

11. In an engine having eight cylinders in line, a crankshaft, an intake manifold structure, said structure including a pair of manifold fuel mixture conducting portions communicating respectively with a group of four of said cylinders, said conducting portions each consisting of a pair of fuel mixture conducting branches each connected with a pair of engine cylinders, said manifold structure arranged in cooperation with the engine crankshaft whereby successive intervals between the firing of said pair of cylinders connected with the same branch are respectively substantially 270 degrees and 450 degrees of crankshaft rotation.

12. In an engine having eight cylinders in line, a crankshaft, an intake manifold structure including a plurality of fuel mixture conducting branches each communicating respectively with a pair of said cylinders and arranged in cooperation with the engine crankshaft whereby successive spacings between the firing of the cylinders connected with the same branch are respectively substantially 270 degrees and 450 degrees of crankshaft rotation.

13. In an engine having eight cylinders in line, a crankshaft, an intake manifold structure including a pair of fuel mixture conducting portions each communicating respectively with a group of four cylinders, each of said fuel mixture conducting portions consisting of a pair of branches, each branch communicating with a pair of engine cylinders, said manifold structure being so constructed and arranged in cooperation with the engine crankshaft that successive intervals of 270 degrees and 450 degrees of crankshaft rotation occur between a firing of one cylinder of each of said branches and the firing of the other cylinder of the same branch, one of said fuel mixture conducting portions communicating with the first, second, seventh and eighth of said cylinders and the other of said fuel mixture conducting portions communicating with the remaining cylinders.

14. In an engine having eight cylinders in line, a crankshaft, an intake manifold structure including a pair of fuel mixture conducting portions each communicating respectively with a group of four cylinders, each of said fuel mixture conducting portions consisting of a pair of branches, each branch communicating with a pair of engine cylinders, said manifold structure being so constructed and arranged in cooperation with the engine crankshaft that successive intervals of 270 degrees and 450 degrees of crankshaft rotation occur between a firing of one cylinder of each of said branches and the firing of the other cylinder of the same branch, one of said fuel mixture conducting portions communicating with the first, second, seventh and eighth of said cylinders and the other of said fuel mixture conducting portions communicating with the remaining cylinders, said cylinders having a firing order of 1—7—3—5—8—2—6—4.

15. In an engine having eight cylinders in line, a crankshaft, an intake manifold structure including a plurality of fuel mixture conducting branches, each branch communicating with a pair of engine cylinders, said manifold structure being arranged to cooperate with the engine crankshaft whereby successive intervals between the firing of said pair of cylinders connected with the same branch are respectively substantially 270 and 450 degrees of crankshaft rotation, said crankshaft having cranks symmetrically constructed about the midpoint thereof, the cranks to one side of the midpoint being successively and progressively advanced 90 degrees while the cranks to the other side of the midpoint are successively and progressively advanced 90 degrees in the opposite direction.

16. In an eight cylinder internal combustion engine, a crankshaft, an intake manifold structure including a plurality of fuel mixture conducting branches, each branch connected with a pair of engine cylinders and arranged for cooperative operation with the engine crankshaft, whereby the intake openings of the cylinders connected with the same branch are spaced apart not less than substantially 270 degrees of the crankshaft rotation, and means for supplying a fuel mixture to said branches.

17. In an engine having eight cylinders divided into two groups of four cylinders each, a crankshaft, a fluid distributing system for said engine including two intake manifold portions respectively cooperating with said two groups of cylinders, one of said intake manifold portions including a pair of oppositely extending manifold branches, a pair of cylinders communicating with each of said branches, the intake manifold portion aforesaid being constructed and arranged in cooperation with the engine crankshaft and engine cylinders so that the intake periods of the cylinders connected with one of said branches are spaced apart by 270 degrees of the crankshaft rotation.

18. In an engine having eight cylinders divided into two groups of four cylinders each, a crankshaft, a fluid distributing system for said engine including two intake manifold portions respectively cooperating with said two groups of cylinders, one of said intake manifold portions including a pair of oppositely extending manifold branches, a pair of cylinders communicating with each of said branches, the intake manifold portion aforesaid being constructed and arranged in cooperation with the engine crankshaft and engine cylinders so that the intake periods of the cylinders connected with both branches of the aforesaid intake manifold portion are spaced apart by 270 degrees of the crankshaft rotation.

19. In an engine having eight cylinders divided into two groups of four cylinders each, a crankshaft, an intake manifold portion for one group of four cylinders and including a pair of manifold branches each connected with a pair of engine cylinders, the aforesaid intake manifold being constructed and arranged in cooperation with the engine cylinders connected therewith and engine crankshaft so that the intake periods of the cylinders connected to one branch of said intake manifold portion are spaced apart by 270 degrees of the crankshaft rotation.

LEWIS P. KALB.